(12) United States Patent  
Kwon et al.

(10) Patent No.: US 8,279,561 B2  
(45) Date of Patent: Oct. 2, 2012

(54) BALANCED MOTOR MICRO-ACTUATOR

(75) Inventors: Haesung Kwon, San Jose, CA (US);  
Hyung Jai Lee, Cupertino, CA (US)

(73) Assignee: Seagate Technology International

( * ) Notice: Subject to any disclaimer, the term of this patent is extended or adjusted under 35 U.S.C. 154(b) by 587 days.

(21) Appl. No.: 12/209,689

(22) Filed: Sep. 12, 2008

(65) Prior Publication Data  
US 2010/0067147 A1    Mar. 18, 2010

(51) Int. Cl.  
*G11B 5/56* (2006.01)

(52) U.S. Cl. .................................... 360/294.3

(58) Field of Classification Search ............... 360/294.3  
See application file for complete search history.

(56) References Cited

U.S. PATENT DOCUMENTS

| | | | |
|---|---|---|---|
| 6,617,762 B2 * | 9/2003 | Kurano et al. | 310/328 |
| 6,930,861 B2 * | 8/2005 | Huha et al. | 360/294.4 |
| 7,110,224 B2 * | 9/2006 | Nakamura et al. | 360/294.1 |
| 7,177,119 B1 * | 2/2007 | Bennin et al. | 360/294.6 |
| 7,746,600 B2 * | 6/2010 | Hancer et al. | 360/294.4 |
| 7,872,834 B1 * | 1/2011 | Pokornowski et al. | 360/294.4 |
| 2002/0064001 A1 * | 5/2002 | Shiraishi et al. | 360/294.4 |
| 2002/0075605 A1 * | 6/2002 | Nishida et al. | 360/294.4 |

* cited by examiner

Primary Examiner — Mark Blouin

(57) ABSTRACT

This application discloses a hard disk drive, a head stack assembly, and a head gimbal assembly, each including a micro-actuator hinge configured to position a slider over a rotating disk surface with greater stroke sensitivity while reducing bending perpendicular to the disk surface. The micro-actuator hinge includes at least one micro-actuator, a hinge plate and at least one hinge plate cover, with the micro-actuator including a first region and a second region, each coupled between the hinge plate and the hinge plate cover.

14 Claims, 4 Drawing Sheets

Fig. 2A  Head stack assembly 50

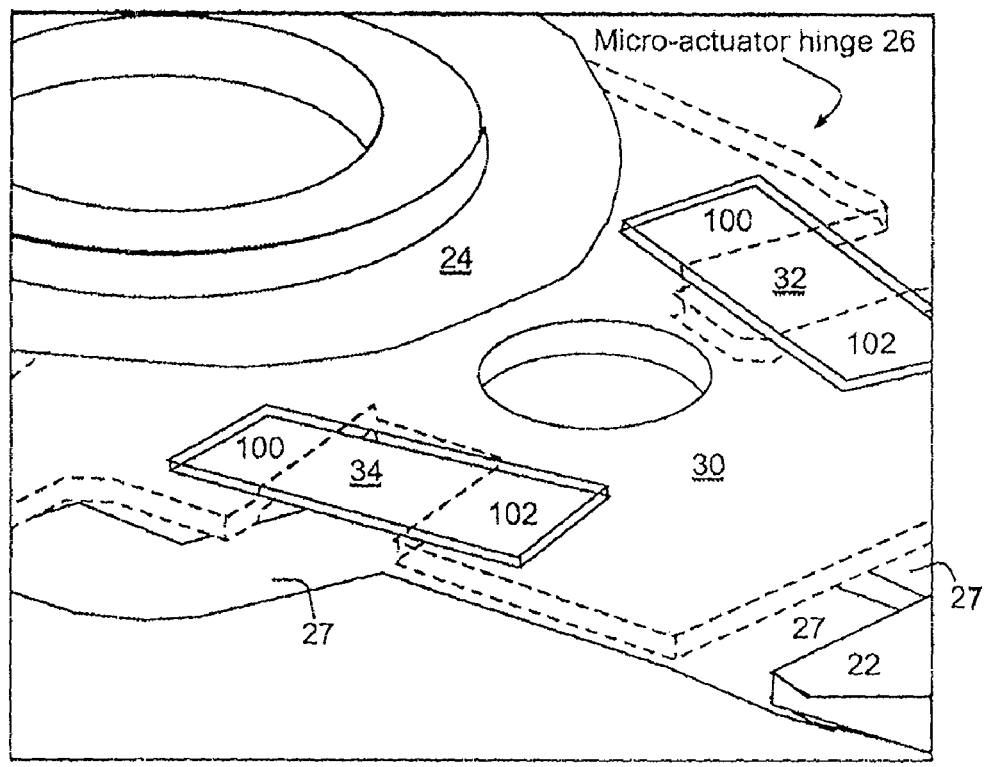
Fig. 3
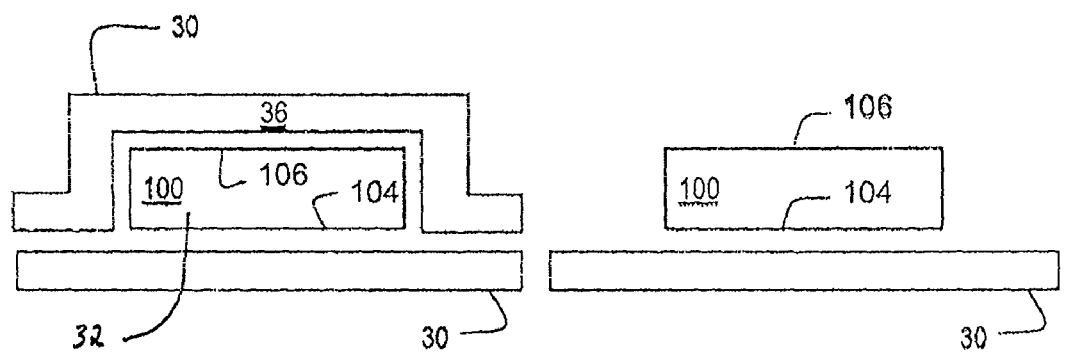
Fig. 4
Fig. 5
Prior art

BALANCED MOTOR MICRO-ACTUATOR

TECHNICAL FIELD

This invention relates to hard disk drives using micro-actuators.

BACKGROUND OF THE INVENTION

Over the last several years, hard disk drives have reached ever greater data densities and with this, have needed ever better positioning mechanisms to access the data they stored on their disk surfaces. Existing positioning mechanisms tend to use piezoelectric micro-actuators that tend to pull or push the elements they couple to in directions perpendicular to the rotating disk surfaces being accessed. What is needed is a way to remove this extraneous motion and preferably increase motion in the plane of the disk surface that can be used to position the read-write elements over the data.

SUMMARY OF THE INVENTION

Embodiments of the invention include a hard disk drive with at least one head gimbal assembly using a micro-actuator hinge to position its slider over the rotating disk surface using at least one micro-actuator, including a first and second region coupling between a hinge plate and a hinge plate cover to effect each of the micro-actuators bending in essentially the plane of the rotating disk surface to at least partly alter the position of the slider over the disk surface. Simulation results indicate that some configurations may offer a 25% improvement in the stroke sensitivity of the micro-actuators while reducing bending perpendicular to the disk surface over prior art approaches. The micro-actuator may employ a thermal-mechanical effect and/or a preferred piezoelectric effect and/or a shape-memory. The micro-actuator hinge may preferably include at least two micro-actuators.

Other embodiments of the invention include the head gimbal assembly and the head stack assembly containing the micro-actuator hinge.

BRIEF DESCRIPTION OF THE DRAWINGS

FIG. 2A shows a perspective view of the voice coil motor, its head stack assembly and the one or more head gimbal assemblies coupled to the one or more actuator arms of FIG. 1.

FIG. 3 shows a perspective view of some further details of the head gimbal assembly of the previous Figures with the micro-actuator hinge including a hinge plate with a first piezoelectric micro-actuator and a second piezoelectric micro-actuator each coupling a first region and a second region to the hinge plate and configured to alter the position of the slider as shown in FIGS. 1 and 2B. The piezoelectric micro-actuators have a preferred bending action essentially in the plane of the disk surface of previous Figures with minimal bending perpendicular to the disk surface.

FIG. 4 shows a cross section view of an example region of the piezoelectric micro-actuator of FIG. 3 coupling between the hinge plate and a hinge plate cover to minimize wasted motion out of the plane of the rotating disk of FIGS. 1 and 2B.

FIG. 5 shows a cross section view of an example region coupling to just the hinge plate as found in a prior art piezoelectric micro-actuator.

DETAILED DESCRIPTION

This invention relates to hard disk drives using micro-actuators. Embodiments of the invention include a hard disk drive with at least one head gimbal assembly using a micro-actuator hinge to position its slider over the rotating disk surface using at least one micro-actuator, including a first and second region coupling between a hinge plate and a hinge plate cover to effect each of the micro-actuators bending in essentially the plane of the rotating disk surface to at least partly alter the position of the slider over the disk surface. Simulation results indicate that some configurations may offer a 25% improvement in the stroke sensitivity of the micro-actuators while reducing bending perpendicular to the disk surface over prior art approaches. The micro-actuator may employ a thermal-mechanical effect and/or a preferred piezoelectric effect and/or a shape-memory. The micro-actuator hinge may preferably include at least two micro-actuators.

Figure 1:
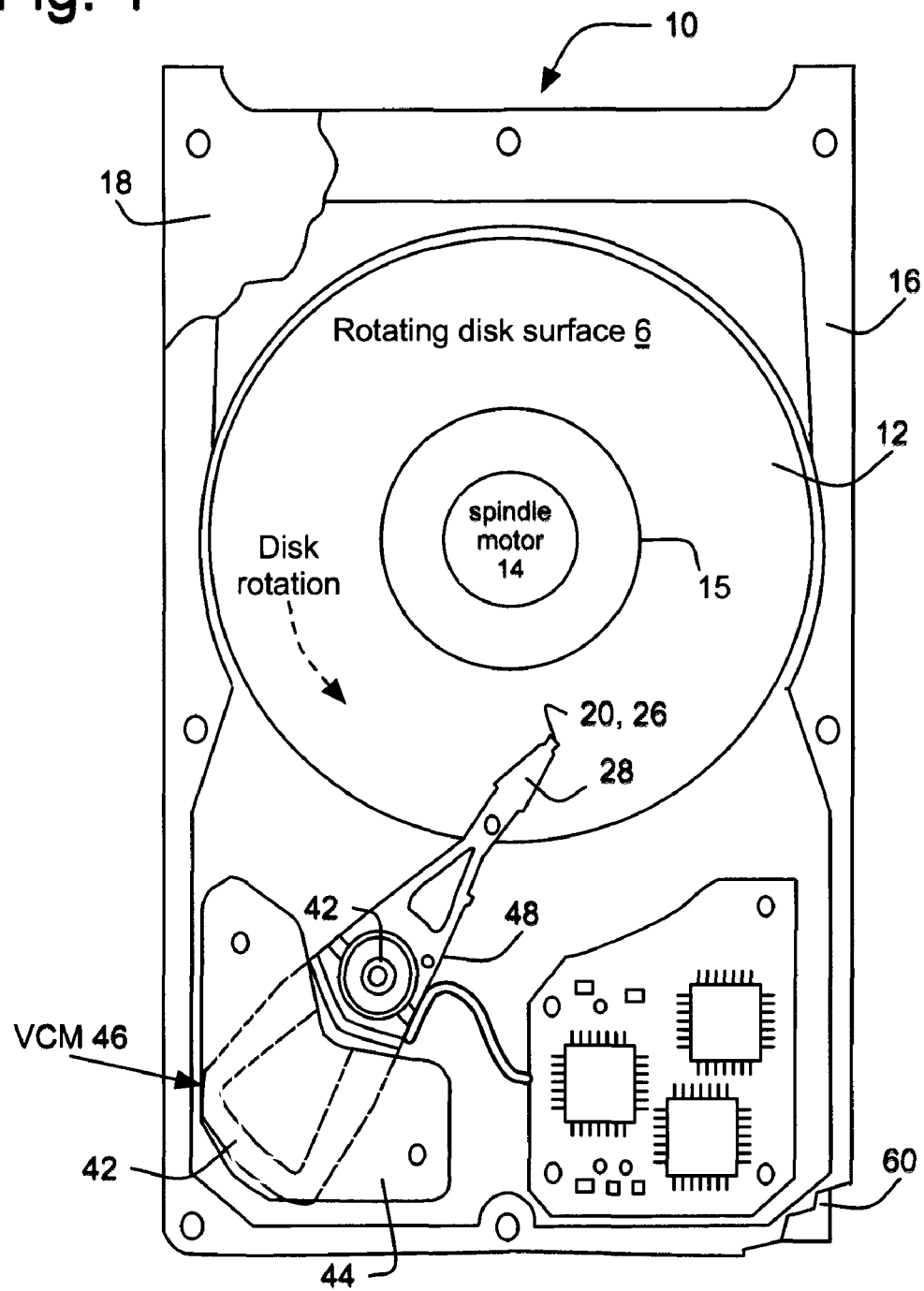
FIG. 1 shows an example of an embodiment of the invention as a hard disk drive including a disk base to which a spindle motor is mounted with at least one disk rotatably coupled to the spindle motor to create a rotating disk surface. A voice coil motor includes a head stack assembly pivotably mounted by an actuator pivot to the disk base, responsive to its voice coil interacting with a fixed magnetic assembly mounted on the disk base and including a head gimbal assembly with a micro-actuator hinge configured to position at least one slider to access data stored on the rotating disk surface. The hard disk drive includes an assembled circuit board also mounted on the disk base opposite the spindle motor and the voice coil motor.

Referring to the drawings more particularly by reference numbers, FIG. 1 shows an example of an embodiment of the invention as a hard disk drive 10 including a disk base 16 to which a spindle motor 14 is mounted with at least one disk 12 rotatably coupled to the spindle motor to create a rotating disk surface 6. A voice coil motor 46 includes a head stack assembly 50 pivotably mounted by an actuator pivot 42 to the disk base, responsive to its voice coil 42 interacting with a fixed magnetic assembly 44 mounted on the disk base and including a head gimbal assembly 28, over the disk base 16, with a micro-actuator hinge 26 configured to position at least one slider 20 to access data 15 stored on the rotating disk surface. The hard disk drive includes an assembled circuit board 60 also mounted on the disk base opposite the spindle motor and the voice coil motor. An assembled circuit board 60 is also mounted on the disk base opposite the spindle motor and the voice coil motor. A disk cover 18 is mounted on the disk base to encapsulate all of the shown components except the assembled circuit board.

The hard disk drive 10 preferably accesses the data 15 arranged in tracks on the rotating disk surface 6 by controlling the spindle motor 14 to rotate the disks 12 at a preferred rate. The data may be organized as tracks that may be configured as concentric circles or as a tightly packed spiral. The voice coil motor 46 operates by stimulating the voice coil 42 with a time varying electrical signal to magnetically interact with the fixed magnet assembly 34 causing the head stack assembly 50 to pivot about the actuator pivot 40 moving the head gimbal assembly 28 to position the slider 20 near the track on the rotating disk surface. In many embodiments, a micro-actuator assembly preferably coupled to the slider may be further stimulated to further control the position of the slider. A vertical micro-actuator either in the micro-actuator assembly, or preferably in the slider, may be stimulated to alter the flying height of the slider over the rotating disk surface.

FIG. 2A shows a perspective view of the voice coil motor 45, its head stack assembly 50 and the one or more head gimbal assemblies 28 coupled to the one or more actuator arms 48 of FIG. 1. The head stack assembly is configured to pivot about the actuator pivot 30.

Figure 2B:
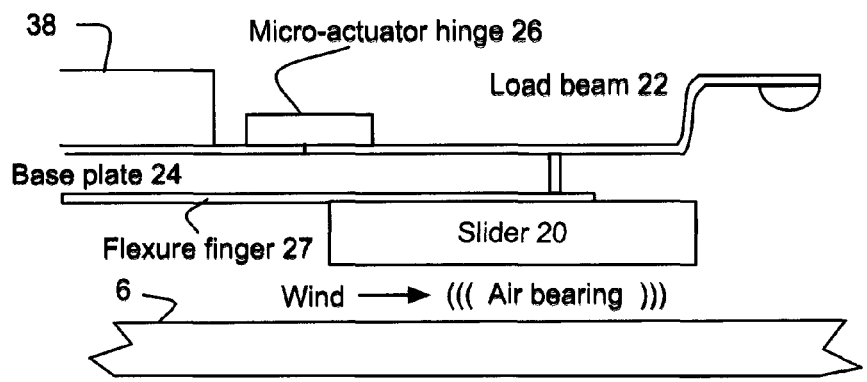
FIG. 2B shows a side view of some details of a head gimbal assembly of the previous Figures, in particular, the micro-actuator hinge coupling between the base plate and the load beam with a flexure finger coupled to the slider.
Figure 2B:
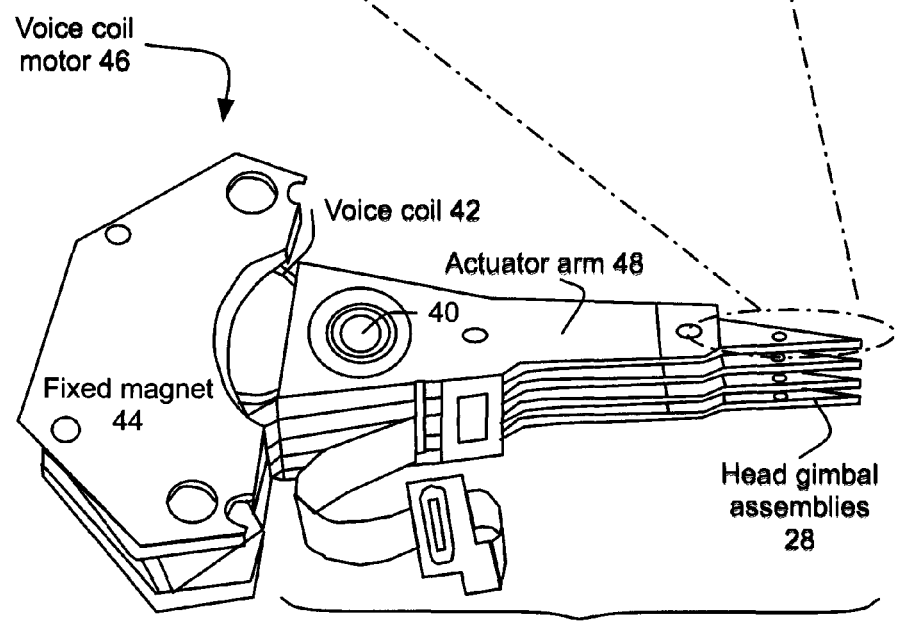

FIG. 2B shows a side view of some details of a head gimbal assembly 28 of the previous Figures, in particular, the micro-actuator hinge 26 coupling between the base plate 24 and the load beam 22 with a flexure finger 27 coupled to the slider 20. The slider may use a perpendicular or longitudinal recording approach to accessing data on the rotating disk surface 6 and may employ a magneto-resistive effect or a tunneling effect to read the data. The slider may include a vertical micro-actuator or the flexure finger may include a vertical micro-actuator. Either approach to vertical micro-actuation may employ a thermal-mechanical effect, a piezoelectric effect, and/or an electro-static effect.

FIG. 3 shows a perspective view of some further details of the head gimbal assembly 28 of the previous Figures with the micro-actuator hinge 26 including a hinge plate 30 shown in dashed lines with a first piezoelectric micro-actuator 32 and a second piezoelectric micro-actuator 34 each coupling a first region 100 and a second region 102 to the hinge plate and configured to alter the position of the slider 20 as discussed with regards to FIGS. 1 and 2B. The hinge plate cover 36 is not shown in this Figure. The piezoelectric micro-actuators have a preferred bending action essentially in the plane of the disk surface 6 of previous Figures with minimal bending perpendicular to the disk surface. In this Figure, the coupling of the piezoelectric micro-actuators favors the same regions coupled toward the base plate 24. In other embodiments, the opposite coupling of regions may be preferred. The flexure finger 27 is shown further providing coupling to the load beam 22 and to the slider 20 as shown in FIG. 2B.

FIG. 4 shows a cross section view of an example region 100 of FIG. 3 coupling between the hinge plate 30 and a hinge plate cover 36. The hinge plate is coupled to both the top 106 and bottom 104 of each adjacent region 100 and 102 of the piezoelectric micro-actuators 32 and 34, reducing bending of these micro-actuators perpendicular to the rotating disk surface 6. The hinge plate 30 is shown above, below, and extending horizontally beyond the region 100 of the micro-actuator 32. Each of these piezoelectric micro-actuators preferably extends or compresses essentially in a plane parallel to the plane of the rotating disk surface. Simulation results indicate that some configurations may offer a 25% improvement in the stroke sensitivity of the micro-actuators while reducing bending perpendicular to the disk surface over prior art approaches as shown in FIG. 5.

For at least one of the piezoelectric micro-actuators 32 and/or 34, the micro-actuator may have at least ten percent of its area covered by the first region 100 and/or second region 102.

The second region 102 may be between the hinge plate 30 and a second hinge plate cover 36 for at least one of the piezoelectric micro-actuators 32 and/or 34.

The hinge plate cover 36 may be between the hinge plate 30 and the rotating disk surface 6. Alternatively, the hinge plate may be between the hinge plate cover and the rotating disk.

By way of comparison, FIG. 5 shows a cross section view of an example region 100 coupling to just the hinge plate 30 as found in the prior art.

Figure 6:
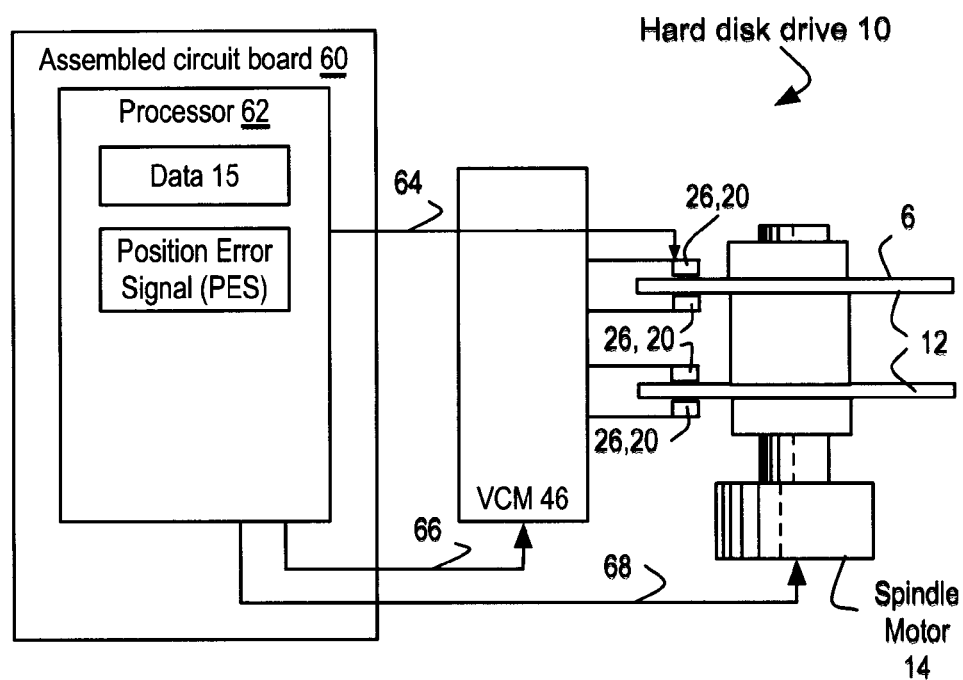
FIG. 6 shows a simplified electrical schematic of the hard disk drive of FIG. 1 where the assembled circuit board includes a processor configured for electrical connection across the voice coil motor to the micro-actuator hinge to alter the position of the slider over the rotating disk surface. The processor is also configured to stimulate the voice coil motor to coarsely position the slider over the rotating disk surface. The processor further stimulates the spindle motor to rotate the disks of the hard disk drive to create the rotating disk surfaces.

FIG. 6 shows a simplified electrical schematic of the hard disk drive 10 of FIG. 1 where the assembled circuit board 60 includes a processor 62 configured for electrical connection 64 across the voice coil motor 46 to the micro-actuator hinge 26 to alter the position of the slider 20 over the rotating disk surface 6. The processor is also configured to stimulate 66 the voice coil motor to coarsely position the slider over the rotating disk surface. The processor further stimulates 68 the spindle motor 14 to rotate the disks 12 of the hard disk drive to create the rotating disk surfaces.

When the hard disk drive 10 has been turned on and data is to be accessed in the hard disk drive, the processor 62 stimulated the spindle motor 14 to rotate the disks 12 to create the rotating disk surface 6. The processor stimulates the voice coil 42 in the voice coil motor 46 with a time-varying electrical signal, causing the voice coil to magnetically interact with the fixed magnetic assembly 44 of FIGS. 1 and 2A moving the actuator arms 48 through the actuator pivot 42 to swing the head gimbal assemblies 28, to coarsely position their sliders 20 of the data 15 on the rotating disk surface.

Once the slider 20 is in position, when a write operation is to be performed the data 15 is written through the slider onto the rotating disk surface 6. When a read operation is to be performed, the slider is used to read the data from the rotating disk surface into the processor 62. Often a Position Error Signal (PES) is derived from the read head of the slider to provide feedback to the processor 62 on the positioning of the slider over the rotating disk surface 6.

Based upon the PES, the processor electrically may stimulate 64 the micro-actuator hinge 26 in the head gimbal assembly to further alter the position of the slider over the rotating disk surface as shown in FIGS. 5A and 5B.

Several different electrical schemes may be used to implement the electrical connection 64 across the voice coil motor 46. For example, a single control signal capable of a range between the first potential difference above a ground to the negative of the first potential difference may be employed. The delivery of the single control signal and a ground may be preferred in some embodiments of the invention, though other scheme involving more active signal lines may also be preferred.

The preceding embodiments provide examples of the invention, and are not meant to constrain the scope of the following claims.

What is claimed is:

1. An apparatus comprising:
   an actuator pivot;
   an actuator arm rigidly coupled to the actuator pivot; and
   a head gimbal assembly coupled to the actuator arm comprised of:
      a micro-actuator hinge comprised of:
         a micro-actuator comprised of a first region adjacent a second region,
         a hinge plate above, below, and extending horizontally beyond the micro-actuator, and
         a hinge plate cover with the first region or the second region coupled between the hinge plate and the hinge plate cover;

a base plate coupled to the micro-actuator hinge; and
a load beam with a flexure finger coupled to the micro-actuator hinge with the micro-actuator hinge between the base plate and the load beam.

2. The apparatus of claim 1, wherein the first region is between the hinge plate and the hinge plate cover and constitutes at least ten percent of the area of the piezoelectric micro-actuator.

3. The apparatus of claim 1, wherein:
the hinge plate cover is a first hinge plate cover; and further comprising:
a second hinge plate cover with the second region between the hinge plate and the second hinge plate cover.

4. The apparatus of claim 1, wherein the second region is between the hinge plate and the hinge plate cover.

5. The apparatus of claim 1, further comprising:
a surface of a disk comprised of a plane; and wherein:
the hinge plate cover is between the hinge plate and the plane.

6. The apparatus of claim 1, wherein the micro-actuator employs at least one member of the group consisting of a thermal-mechanical effect, a piezoelectric effect and a shape memory alloy.

7. The apparatus of claim 1, wherein:
the micro-actuator is a first micro-actuator; and
the micro-actuator hinge comprised of a second micro-actuator.

8. An apparatus comprising:
a micro-actuator hinge comprised of:
a micro-actuator comprised of a first region adjacent a second region,
a hinge plate above, below, and extended horizontally beyond the micro-actuator, and
a hinge plate cover with the first region or the second region coupled between the hinge plate and the hinge plate cover;
a base plate coupled to the micro-actuator hinge, and
a load beam with a flexure finger coupled to the micro-actuator hinge with the micro-actuator hinge between the base plate and the load beam.

9. The apparatus of claim 8, wherein the first region is between the hinge plate and the hinge plate cover and constitutes at least ten percent of the area of the piezoelectric micro-actuator.

10. The apparatus of claim 8, wherein:
the hinge plate cover is a first hinge plate cover; and further comprising:
a second hinge plate cover with the second region between the hinge plate and the second hinge plate cover.

11. The apparatus of claim 8, wherein the second region is between the hinge plate and the hinge plate cover.

12. The apparatus of claim 8, further comprising:
a surface of a disk comprised of a plane; and wherein:
the hinge plate cover is between the hinge plate and the plane.

13. The apparatus of claim 8, wherein the micro-actuator employs at least one member of the group consisting of a thermal-mechanical effect, a piezoelectric effect and a shape memory alloy.

14. The apparatus head gimbal assembly of claim 8, wherein:
the micro-actuator is a first micro-actuator; and
the micro-actuator hinge comprised of a second micro-actuator.

* * * * *